United States Patent
Asada

(10) Patent No.: US 11,753,735 B2
(45) Date of Patent: Sep. 12, 2023

(54) NICKEL-COATED COPPER FOIL AND METHOD FOR MANUFACTURING THE SAME

(71) Applicant: PROTERIAL, LTD., Tokyo (JP)

(72) Inventor: Ken Asada, Osaka (JP)

(73) Assignee: PROTERIAL, LTD., Tokyo (JP)

( * ) Notice: Subject to any disclaimer, the term of this patent is extended or adjusted under 35 U.S.C. 154(b) by 0 days.

(21) Appl. No.: 17/274,018

(22) PCT Filed: Sep. 4, 2019

(86) PCT No.: PCT/JP2019/034835
§ 371 (c)(1),
(2) Date: Mar. 5, 2021

(87) PCT Pub. No.: WO2020/050331
PCT Pub. Date: Mar. 12, 2020

(65) Prior Publication Data
US 2021/0310144 A1    Oct. 7, 2021

(30) Foreign Application Priority Data

Sep. 6, 2018 (JP) .................................. 2018-166676

(51) Int. Cl.
*B32B 15/20* (2006.01)
*C25D 5/00* (2006.01)
(Continued)

(52) U.S. Cl.
CPC .............. *C25D 5/627* (2020.08); *B32B 15/01* (2013.01); *B32B 15/20* (2013.01); *C25D 5/12* (2013.01);
(Continued)

(58) Field of Classification Search
None
See application file for complete search history.

(56) References Cited

U.S. PATENT DOCUMENTS

| 4,483,906 | A | * | 11/1984 | Nakatsugawa | ........ | H05K 3/384 |
| | | | | | | 428/607 |
| 5,985,469 | A | * | 11/1999 | Kurakata | ............... | G04B 37/22 |
| | | | | | | 428/938 |

(Continued)

FOREIGN PATENT DOCUMENTS

| JP | 02256158 A | * | 10/1990 |
| JP | H02256158 A | | 10/1990 |

(Continued)

OTHER PUBLICATIONS

Nickel Plated Copper Foil, Mar. 11, 2019, https://www.copperfoilroll.com/sale-10468435-single-side-100-pure-nickel-plated-copper-foil-for-electrical-appliances.html (Year: 2019).*

(Continued)

*Primary Examiner* — Mary I Omori
(74) *Attorney, Agent, or Firm* — MILLEN WHITE ZELANO AND BRANIGAN, PC; Csaba Henter

(57) ABSTRACT

A nickel-coated copper foil suitable for mass production, to which YAG laser welding can be applied while reducing the electrical resistivity by forming a nickel plating layer with a thickness of 0.5 μm or less on a surface of a copper foil by Ni plating, is provided. The nickel-coated copper foil has an overall thickness of 200 μm or less, and includes a copper layer made of Cu or a Cu alloy, and a nickel plating layer made of Ni or a Ni alloy, covering a surface of the copper foil, having a thickness of 0.01 μm or more and 0.5 μm or less, and including a surface having an a* value of 0 or more and 10 or less and a b* value of 0 or more and 14 or less in an L*a*b* color system obtained by an SCI measurement method in accordance with JIS Z 8722.

8 Claims, 2 Drawing Sheets

(51) Int. Cl.
  *C25D 5/12* (2006.01)
  *B32B 15/01* (2006.01)
  *C25D 5/50* (2006.01)
  *C25D 7/06* (2006.01)
  *H01M 4/66* (2006.01)
  *H01M 4/02* (2006.01)

(52) U.S. Cl.
  CPC .............. *C25D 5/50* (2013.01); *C25D 5/611* (2020.08); *C25D 7/06* (2013.01); *H01M 4/661* (2013.01); *H01M 4/667* (2013.01); *B32B 2307/732* (2013.01); *H01M 2004/027* (2013.01)

(56) References Cited

U.S. PATENT DOCUMENTS

| | | | | |
|---|---|---|---|---|
| 2003/0068517 A1* | 4/2003 | Andresakis | ............. | H05K 1/16 428/607 |
| 2004/0191560 A1* | 9/2004 | Matsuda | ............... | C25D 5/627 428/626 |
| 2008/0176144 A1* | 7/2008 | Iwama | ................. | H01M 4/134 429/338 |
| 2016/0308198 A1* | 10/2016 | Oda | ........................ | B32B 15/01 |
| 2018/0247734 A1 | 8/2018 | Matsuo et al. | | |
| 2018/0298509 A1* | 10/2018 | Lai | .......................... | C25D 5/48 |

FOREIGN PATENT DOCUMENTS

| | | | |
|---|---|---|---|
| JP | 2011-105960 A | 6/2011 | |
| JP | 2015-209581 A | 11/2015 | |
| JP | 2016-008343 A | 1/2016 | |
| WO | WO-2016035604 A1 * | 3/2016 | .............. C25D 5/16 |
| WO | 2018/055884 A1 | 3/2018 | |

OTHER PUBLICATIONS

Mizoguchi et al., machine translation of JPWO2016035604, Jun. 15, 2017 (Year: 2017).*

International Search Report for PCT/JP2019/034835 dated Oct. 15, 2019.

May 18, 2006, p. 11, (first printing, Johokiko Co., LTD.), non-official translation (Taniguchi, Akitoshi, "Classified by process, type, use Latest plating technology—Consideration of mechanism and quality improvement-".

English Translation of May 18, 2006, p. 11, (first printing, Johokiko Co., Ltd.), non-official translation (Taniguchi, Akitoshi, "Classified by process, type, use Latest plating technology—Consideration of mechanism and quality improvement-".

English Translation of JP2016008343, Publication Date: Jan. 18, 2016.

English Translation of JP2015-209581, Publication Date: Nov. 24, 2015.

English Translation of JP2011-105960, Publication Date: Jun. 2, 2011.

English Translation of JPH02256158, Publication Date: Oct. 16, 1990.

* cited by examiner

NICKEL-COATED COPPER FOIL AND METHOD FOR MANUFACTURING THE SAME

TECHNICAL FIELD

The present invention relates to a nickel-coated copper foil and a method for manufacturing the same.

BACKGROUND ART

In general, for leads and negative electrode collectors of various batteries such as a lithium-ion secondary battery, as a conductive material, a copper foil made of Cu (copper) or a Cu alloy, a nickel foil made of Ni (nickel) or a Ni alloy, or a clad foil having a three-layer structure (nickel layer/copper layer/nickel layer) including a copper layer made of Cu or a Cu alloy and a nickel layer made of Ni or a Ni alloy is used, for example. As the conductive material, a material having a lower electrical resistivity, and better workability, corrosion resistance and weldability is desired. For example, the electrical resistivity of a copper foil containing 99 mass % or more of Cu is about $1.7 \times 10^{-6}$ Ω·cm, and the electrical resistivity of a nickel foil containing 99 mass % or more of Ni is about $7.0 \times 10^{-6}$ Ω·cm. Thus, the copper foil has a lower electrical resistivity and better conductivity than the nickel foil. On the other hand, the nickel foil has better workability, corrosion resistance and weldability than the copper foil. Furthermore, the nickel layer of the clad foil generally has a large thickness, and the end face of the copper layer is exposed. Thus, the clad foil is more disadvantageous than the nickel foil from the viewpoint of corrosion resistance.

For example, Patent Document 1 discloses a lead tab material (nickel-coated copper foil) made of Cu or a Cu alloy. A nickel layer made of Ni is provided on a surface of the lead tab material by Ni plating or Ni vapor deposition. The thickness of this nickel layer is preferably 10 μm or less and more preferably in the range of 0.01 μm to 5 μm. This lead tab material is considered to facilitate normal welding such as resistance welding, laser welding, and ultrasonic welding. Resistance welding and ultrasonic welding are bonding methods that involve physical contact. Therefore, an entry route for a contact component (such as an electrode or an oscillator) reaching a joint is required, and the shape restrictions of the contact component and replacement of the contact component at the time of wear are required. On the other hand, laser welding is a bonding method that does not involve physical contact, and thus even an extremely small joint can be welded as long as there is an irradiation route for laser light reaching the joint. As compared with welding with another heat source, in the laser welding, the welding bead width, the heat-affected width, the heat strain, and the heat deformation are smaller, and high-precision and high-quality bonding is possible.

Therefore, it is desired that laser welding can be applied to the conductive material used for the leads and the negative electrode collectors.

PRIOR ART DOCUMENT

Patent Document

Patent Document 1: Japanese Patent Laid-Open No. 2-256158

SUMMARY OF THE INVENTION

Problems to be Solved by the Invention

In laser welding, YAG laser light (a wavelength of 1064 nm) is widely used. When the surface oxide film is removed from the copper foil such that the copper foil has a smooth surface (the arithmetic average roughness Ra is about 0.02 μm), the reflectance of YAG laser light (vertical incidence in an air atmosphere of about 20° C.) exceeds 90%. Therefore, when such a copper foil is bonded by YAG laser welding, it is necessary to sufficiently increase the power density in order to radiate YAG laser light. However, when the copper foil is in a molten state, the reflectance drops sharply, and thus the power density of YAG laser light acting on the molten copper far exceeds a level required for welding. Thus, the molten copper evaporates, and a large hole or dent is disadvantageously formed in a laser welded portion. The application of the lead tab material (nickel-coated copper foil) disclosed in Patent Document 1 is conceivably effective for the problem caused by the reflectance of the copper foil. However, from the description of Patent Document 1 that only discloses the evaluation results by resistance welding, it cannot be easily understood whether laser welding is applicable to this lead tab material.

A material having a lower electrical resistivity (volume resistivity) is desired as the conductive material used for the leads and the negative electrode collectors, and thus a nickel-coated copper foil having a smaller proportion of a nickel layer having a higher electrical resistivity is required. For example, a nickel-coated copper foil having a nickel layer thickness of 0.5 μm or less and an overall thickness of 20 μm or less (a copper layer thickness of 19 μm or less) is conceivable. The nickel layer having a thickness of 5 μm shown in Example 1 of Patent Document 1 is formed by nickel plating, while the nickel layer having a thickness of 0.1 μm shown in Example 2 is formed by Ni vapor deposition. Thus, conventionally, Ni vapor deposition has been applied to formation of a nickel layer having a small thickness, e.g. 0.1 μm or less, on the surface of the lead tab material. This is because it is not easy to form a nickel layer having a small thickness densely by nickel plating. For example, a practical technique suitable for mass production that can inexpensively form a nickel plating layer having a dense structure with a thickness of 0.5 μm or less is not generally known. Furthermore, when Ni vapor deposition is applied to formation of the nickel layer, the cost of the conductive material used for the leads and the negative electrode collectors is greatly increased.

An object of the present invention is to provide a nickel-coated copper foil suitable for mass production, to which YAG laser welding can be applied while reducing the electrical resistivity (volume resistivity), and a method for manufacturing the same.

Means for Solving the Problems

In order to solve the aforementioned problems, the inventor has diligently studied to optimize a nickel plating layer formed by nickel plating, has found the significance that the nickel plating layer that covers a copper foil has a relatively coarse structure rather than a dense structure, and has come up with the present invention.

A nickel-coated copper foil according to the present invention has an overall thickness of 200 μm or less, and includes a copper layer made of Cu or a Cu alloy, and a nickel plating layer made of Ni or a Ni alloy, the nickel plating layer covering a surface of the copper layer, the nickel plating layer having a thickness of 0.01 μm or more and 0.5 μm or less, the nickel plating layer including a surface having an a* value of 0 or more and 10 or less and a b* value of 0 or more and 14 or less in an L*a*b* color system obtained by an SCI measurement method in accordance with JIS Z 8722.

The nickel plating layer preferably has a thickness of 0.03 μm or more.

The nickel plating layer preferably has a thickness of 0.1 μm or less.

The nickel-coated copper foil preferably has a volume resistivity of 2 μΩ·cm or less, the volume resistivity being obtained in a room temperature environment by a 4-terminal method in accordance with JIS C 2525.

The nickel-coated copper foil described above is obtained by a method for manufacturing a nickel-coated copper foil according to the present invention. Specifically, a method for manufacturing a nickel-coated copper foil having an overall thickness of 200 μm or less includes forming a nickel plating layer made of Ni or a Ni alloy on a surface of a copper foil made of Cu or a Cu alloy by a plating process, and the plating process is performed such that the nickel plating layer has a thickness of 0.01 μm or more and 0.5 μm or less and includes a surface having an a* value of 0 or more and 10 or less and a b* value of 0 or more and 14 or less in an L*a*b* color system obtained by an SCI measurement method in accordance with JIS Z 8722.

After the plating process, a heat treatment is preferably performed such that the nickel plating layer includes the surface having the a* value of 0 or more and 10 or less and the b* value of 0 or more and 14 or less in the L*a*b* color system obtained by the SCI measurement method in accordance with JIS Z 8722.

Effect of the Invention

According to the present invention, it is possible to provide the nickel-coated copper foil suitable for mass production, to which YAG laser welding can be applied while reducing the electrical resistivity (volume resistivity) by forming the nickel plating layer with a thickness of 0.01 μm or more and 0.5 μm or less on the surface of the copper foil by Ni plating, and the method for manufacturing the same.

MODES FOR CARRYING OUT THE INVENTION

A nickel-coated copper foil and a method for manufacturing the same according to the present invention are hereinafter described with reference to the drawings as appropriate. When an element is intended, it is expressed by an element symbol (such as Cu or Ni), and when a layer is intended, it is expressed as a copper layer or a nickel plating layer, for example. When the front and back surfaces of the nickel plating layer are distinguished, they may be expressed as a nickel plating layer (front surface) and a nickel plating layer (back surface), for example.

One Example of Embodiment

Figure 1:
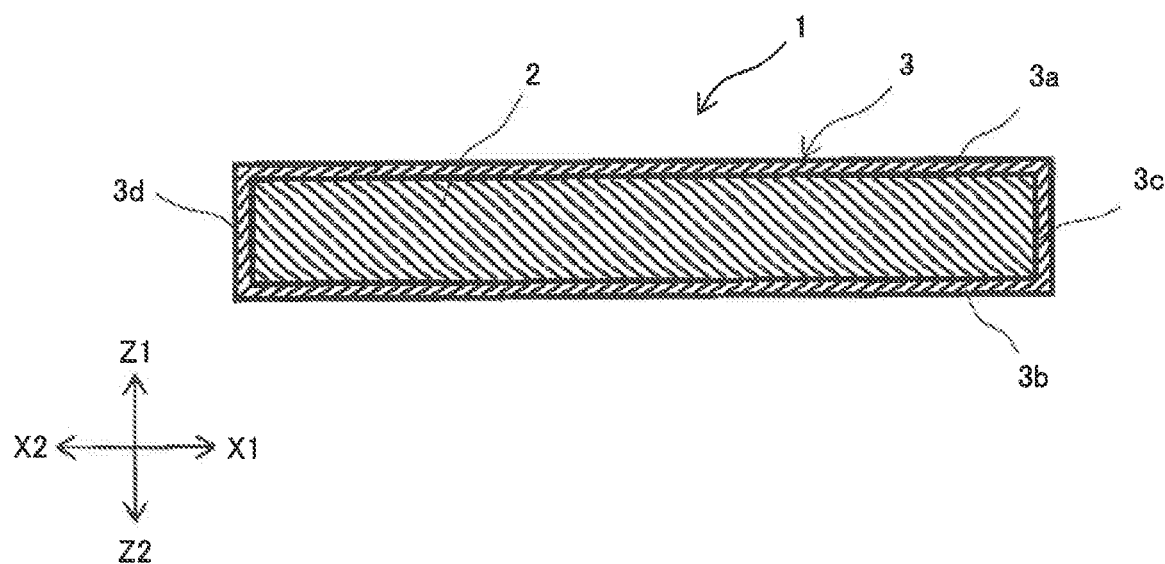
FIG. 1 A diagram schematically showing a layer structure about one example of an embodiment of a nickel-coated copper foil (nickel plating layer/copper layer/nickel plating layer) according to the present invention.

FIG. 1 schematically shows the layer structure of a nickel-coated copper foil 1 of one example of an embodiment of the nickel-coated copper foil according to the present invention. The nickel-coated copper foil 1 has an overall thickness of 200 μm or less. The nickel-coated copper foil 1, which is a thin metal material having an overall thickness of 200 μm or less, has better press workability such as punching and bending forming and a higher degree of freedom in shape as compared with a thick metal material having an overall thickness of more than 200 μm, and thus it is easy to process it into a shape suitable for the application. Therefore, the nickel-coated copper foil 1 having an overall thickness of 200 μm or less is preferable as a conductive material used for leads and negative electrode collectors of various batteries such as a lithium-ion secondary battery. The overall thickness (plate thickness) and width (plate width) of the nickel-coated copper foil 1 according to the present invention are values (average values) obtained by measuring a plurality of times at random using a contact type dial gauge (a scale interval of 0.1 μm) and a length measurement meter (metallographic microscope; a scale interval of 1 μm), respectively.

The nickel-coated copper foil 1 includes a copper layer 2 made of Cu or a Cu alloy, and a nickel plating layer 3 that covers the surface of the copper layer 2 and is made of Ni or a Ni alloy. The nickel-coated copper foil 1 has a lower electrical resistivity (volume resistivity) than a conventional nickel foil. Therefore, from the viewpoint of electrical resistivity, the nickel-coated copper foil 1 is preferable as the conductive material to the nickel foil. Furthermore, the nickel-coated copper foil 1 has improved mechanical strength and corrosion resistance by having the nickel plating layer as compared with a conventional copper foil. Therefore, from the viewpoint of mechanical strength and corrosion resistance, the nickel-coated copper foil 1 is preferable as the conductive material to the copper foil.

The nickel plating layer 3 provided on the nickel-coated copper foil 1 includes a nickel plating layer 3a that covers a surface of the copper layer 2 on the Z1 side, a nickel plating layer 3b that covers a surface of the copper layer 2 on the Z2 side, a nickel plating layer 3c that covers a surface of the copper layer 2 on the X1 side, and a nickel plating layer 3d that covers a surface of the copper layer 2 on the X2 side. The end faces of the copper layer 2 are not exposed to the outside such that the nickel-coated copper foil 1 in which the entire surface of the copper layer 2 is covered with the nickel plating layer 3 has improved corrosion resistance.

In the nickel-coated copper foil 1, the thickness of the nickel plating layer 3 (nickel plating layers 3a, 3b, 3c, and 3d) is 0.01 μm or more and 0.5 μm or less. In the nickel-coated copper foil 1, the thickness of the nickel plating layer 3 influences the electrical resistivity (volume resistivity). It is desired that the conductive material has a lower electrical resistivity, and thus the thickness of the nickel plating layer 3 is 0.01 μm or more and 0.5 μm or less such that as compared with a case in which the thickness of the nickel plating layer exceeds 0.5 μm, the nickel-coated copper foil 1 having a lower electrical resistivity (volume resistivity) can be obtained. In the nickel-coated copper foil 1, the surface of the copper layer 2 may be dissipatively exposed as long as the thickness of the nickel plating layer 3 is in the range of 0.01 μm or more and 0.5 μm or less, and an a* value and a b* value described below are in predetermined ranges. The thickness of the nickel plating layer 3 is intended to be a thickness obtained by fluorescent X-ray analysis described below. When the thickness of the nickel plating layer 3 obtained by fluorescent X-ray analysis is 0.01 μm or more and 0.5 μm or less, the surface of the copper layer 2 may be dissipatively exposed as described above. The nickel plating layer 3 having such a surface form can be formed by a Ni plating process such as electrolytic plating or strike plating. General-purpose and simple electrolytic plating is preferable, but when the nickel plating layer 3 having a small thickness of 0.05 μm or less is formed, Ni strike plating in which a higher current is applied and a shorter-time process is performed as compared with electrolytic plating is suitable.

When the thickness of the nickel plating layer 3 of the nickel-coated copper foil 1 is less than 0.01 μm, the proportion of the underlying copper layer 2 exposed to the surface of the nickel plating layer 3 tends to increase sharply. Therefore, the influence of the underlying copper layer 2 for the nickel plating layer 3 becomes remarkable, and the reflectance of YAG laser light increases such that it may be difficult to apply YAG laser welding to the nickel-coated copper foil. From this point of view, the thickness of the nickel plating layer 3 of the nickel-coated copper foil 1 is set to 0.01 μm or more, and is preferably set to 0.03 μm or more from the viewpoint of welding stability described below. When the thickness of the nickel plating layer 3 of the nickel-coated copper foil 1 exceeds 0.5 μm, the nickel plating structure becomes dense, and the copper layer 2 is substantially free from surface exposure. Therefore, laser welding using YAG laser light can be easily performed as in the case of the nickel foil. However, the nickel-coated copper foil 1 contains an excessive amount of Ni, and thus the conductive material becomes expensive. Furthermore, excessive nickel plating disadvantageously hinders production efficiency. Therefore, from the viewpoint of making mass production more suitable, the thickness of the nickel plating layer 3 is set to 0.5 μm or less (preferably less than 0.5 μm). Furthermore, the thickness of the nickel plating layer 3 of the nickel-coated copper foil 1 is preferably less than 0.5 μm, more preferably 0.3 μm or less, and even more preferably less than 0.1 μm from the viewpoint of providing a less expensive conductive material. The thickness of the nickel plating layer 3 of the nickel-coated copper foil 1 according to the present invention is a value obtained based on Ni intensity analysis by fluorescent X-ray analysis.

The nickel-coated copper foil 1 is a preferable metal material as the conductive material used for the leads and the negative electrode collectors of various batteries such as a lithium-ion secondary battery, and thus the volume resistivity obtained in a room temperature environment by a 4-terminal method in accordance with JIS C 2525 is preferably 2 μΩ·cm or less, and more preferably 1.9 μΩ·cm or less. The nickel-coated copper foil 1 has a preferable volume resistivity of 2 μΩ·cm or less (more preferably 1.9 μΩ·cm or less) such that it may be slightly inferior to the conventional copper foil (with a volume resistivity of about 1.7 μΩ·cm), but the electrical resistivity (volume resistivity) is sufficiently smaller than that of the aforementioned conventional nickel foil (with a volume resistivity of about 7 μΩ·cm) and the aforementioned conventional clad foil (with a volume resistivity of about 3 μΩ·cm). Therefore, from the viewpoint of electrical resistivity, the nickel-coated copper foil 1 is preferable as the conductive material to the nickel foil.

The surface of the nickel plating layer 3 of the nickel-coated copper foil 1 has an a* value of 0 or more and 10 or less and a b* value of 0 or more and 14 or less in an L*a*b* color system obtained by an SCI measurement method in accordance with JIS Z 8722. The L* value, the a* value, and the b* value of the surface of the nickel plating layer 3 can be adjusted when the nickel plating layer 3 is formed on the surface of the copper foil (copper layer 2), and can be adjusted depending on the heat treatment atmosphere, for example, even when a heat treatment is performed after that. As described below, when laser welding by YAG laser light is performed using the nickel-coated copper foil 1 in which the a* value of the surface of the nickel plating layer 3 is 0 or more and 10 or less, and the b* value of the surface of the nickel plating layer 3 is 0 or more and 14 or less, a sufficiently bonded state can be obtained without increasing the power density excessively. This is because the nickel plating layer 3 having a thickness of 0.01 μm or more and 0.5 μm or less is formed on the surface of the copper foil (copper layer 2) such that the surface of the nickel-coated copper foil 1 becomes in a state in which the reflectance of YAG laser light is lower than that of the surface of a copper foil having no nickel plating layer.

As described below with reference to FIG. 3, from the viewpoint of welding stability at the time of performing laser welding, the lower limit of the a* value of the surface of the nickel plating layer 3 may be 0 or more or 1 or more, and the upper limit thereof is not limited as long as it is 10 or less. For example, it may be 8 or less, 6 or less, 4 or less, and 3 or less. From the same viewpoint, the upper limit of the b* value of the surface of the nickel plating layer 3 may be 14 or less or 12 or less, and the lower limit thereof is not limited as long as it is 0 or more. For example, it may be 2 or more, 4 or more, 6 or more, or 8 or more. The nickel-coated copper foil 1 that exhibits such an a* value and a b* value is used such that laser welding with excellent welding stability by YAG laser light can be performed.

The SCI (Specular Components Include) method is a method for measuring diffuse reflected light (total reflected light) including specular reflected light. The reflection angles and amounts (intensities) of specular reflected light and diffuse reflected light are likely to change depending on the surface texture (especially the surface roughness) of an object to be measured, but according to the SCI method for measuring total reflected light, the color (object color) of the object to be measured itself can be evaluated. Therefore, the L* value, the a* value, and the b* value obtained by the SCI method are not easily influenced by the surface state, i.e. the surface roughness, of the object. The L*a*b* color system includes an index L* indicating luminance and indices (chromaticity) a* and b* indicating hue and saturation. L* is an index indicating lightness (luminance) and is a value between 0 (black) and 100 (white), a* is an index indicating chromaticity between red (positive value) and green (negative value), and b* is an index indicating chromaticity between yellow (positive value) and blue (negative value). The combination of a* and b* (a*, b*) is defined on the coordinate axis such that the saturation can be represented by a distance (vector length) from the origin (0, 0), and the hue can be represented by the direction of the vector.

From the above viewpoint, the surface state of the nickel-coated copper foil 1 obtained by changing the degree of surface exposure of the underlying copper layer 2 due to the thickness of the overlying nickel plating layer 3 exhibits an object color peculiar to the surface state, and thus it can be evaluated as a unique color using the a* value and the b* value in the L*a*b* color system. The a* value and the b* value of Ni (metallic nickel) of the overlaying layer are both 0 or more, and the a* value and the b* value of Cu (metallic copper) of the underlying layer are both 0 or more. Therefore, both the a* value and the b* value of the surface of the nickel-coated copper foil 1 (the surface of the nickel plating layer 3) do not become negative values, but become 0 or more.

Modified Example of Embodiment

Figure 2:
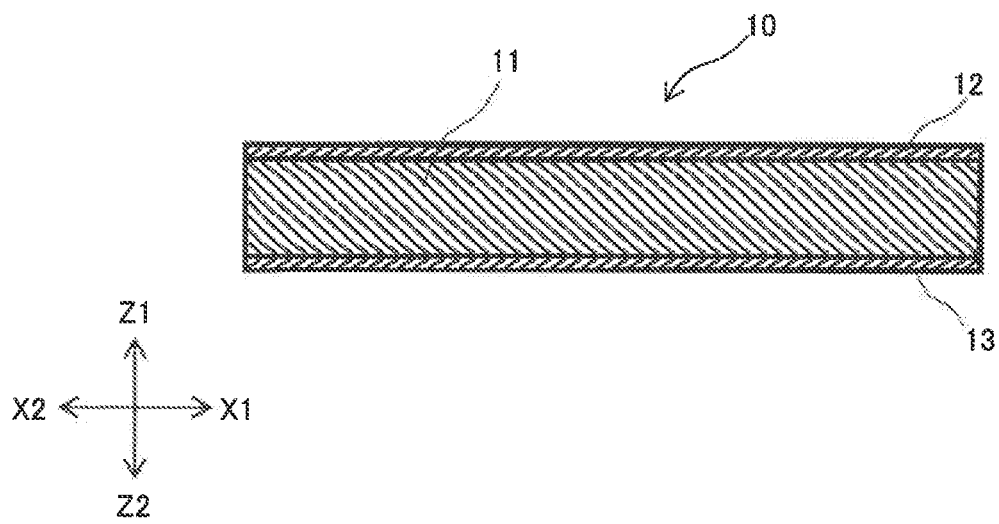
FIG. 2 A diagram schematically showing a layer structure about one example (modified example) of the embodiment of the nickel-coated copper foil (nickel plating layer/copper layer/nickel plating layer) according to the present invention.

FIG. 2 schematically shows the layer structure of a nickel-coated copper foil 10 of a modified example of the embodiment of the nickel-coated copper foil according to the present invention. The nickel-coated copper foil 10 has an overall thickness of 200 μm or less. The nickel-coated copper foil 10 includes a copper layer 11 made of Cu or a Cu alloy, and nickel plating layers 12 and 13 made of Ni or a Ni alloy. The nickel plating layer 12 covers a surface of the copper layer 11 on the Z1 side, and the nickel plating layer 13 covers a surface of the copper layer 11 on the Z2 side. Unlike the nickel-coated copper foil 1 shown in FIG. 1, the nickel-coated copper foil 10 includes the copper foil 11 exposed on the side surface on the X1 side and the side surface on the X2 side. As shown in FIG. 2, even when the nickel-coated copper foil 10 includes the copper foil 11 exposed on the side surfaces, the overall thickness is 200 μm or less, and thus problems due to corrosion resistance rarely occur in practice.

The thicknesses of the nickel plating layers 12 and 13 of the nickel-coated copper foil 10 are both 0.01 μm or more and 0.5 μm or less, and the reason is the same as in the case of the nickel-coated copper foil 1 described above. As long as the thicknesses of the nickel plating layers 12 and 13 are in the range of 0.01 μm or more and 0.5 μm or less, and the aforementioned a* value and b* value are in predetermined ranges, the surface of the cupper layer 11 may be dissipatively exposed. The thicknesses of the nickel plating layers 12 and 13 are intended to be thicknesses obtained by fluorescent X-ray analysis described below. When the thicknesses of the nickel plating layers 12 and 13 obtained by fluorescent X-ray analysis are 0.01 μm or more and 0.5 μm or less, the surface of the cupper layer 11 may be dissipatively exposed as described above. The thicknesses of the nickel plating layers 12 and 13 of the nickel-coated copper foil 10 are 0.01 μm or more, preferably 0.03 μm or more, while the thicknesses of the nickel plating layers 12 and 13 of the nickel-coated copper foil 10 are 0.5 μm or less, preferably less than 0.5 μm, more preferably 0.3 μm or less, and even more preferably less than 0.1 μm for the same reason as in the case of the nickel-coated copper foil 1 described above.

The nickel-coated copper foil 10 preferably has a volume resistivity of 2 μΩ·cm or less and more preferably has a volume resistivity of 1.9 μΩ·cm or less, which is obtained in a room temperature environment by a 4-terminal method in accordance with JIS C 2525, for the same reason as the nickel-coated copper foil 1 described above.

The nickel-coated copper foil 10 has a low electrical resistivity (volume resistivity), has appropriate mechanical strength, and is easy to process, as in the case of the aforementioned example of the embodiment. Therefore, the nickel-coated copper foil 10 including the nickel plating layers 12 and 13 on the front and back surfaces of the copper layer 11 is a preferable metal material as a conductive material used for leads and negative electrode collectors of various batteries such as a lithium-ion secondary battery.

The surfaces of the nickel plating layers 12 and 13 of the nickel-coated copper foil 10 have an a* value of 0 or more and 10 or less and a b* value of 0 or more and 14 or less in an L*a*b* color system obtained by an SCI measurement method in accordance with JIS Z 8722 for the same reason as the nickel-coated copper foil 1 described above. The L* value, the a* value, and the b* value of the surfaces of the nickel plating layers 12 and 13 can be adjusted when the nickel plating layers 12 and 13 are formed on the surface of the copper foil (copper layer 11), and can be adjusted depending on the heat treatment atmosphere, for example, even when a heat treatment is performed after that. Similarly to the nickel-coated copper foil 1 described above, from the viewpoint of welding stability at the time of performing laser welding, the lower limit of the a* value of the surfaces of the nickel plating layers 12 and 13 of the nickel-coated copper foil 10 may be 0 or more or 1 or more, and the upper limit thereof is not limited as long as it is 10 or less. For example, it may be 8 or less, 6 or less, 4 or less, and 3 or less. From the same viewpoint, the upper limit of the b* value of the surfaces of the nickel plating layers 12 and 13 may be 14 or less or 12 or less, and the lower limit thereof is not limited as long as it is 0 or more. For example, it may be 2 or more, 4 or more, 6 or more, or 8 or more. The nickel-coated copper foil 10 that exhibits such an a* value and a b* value is used such that laser welding with excellent welding stability by YAG laser light can be performed.

A method for manufacturing the nickel-coated copper foil according to the present invention is now described with reference to the nickel-coated copper foil 1 shown in FIG. 1 as one example of the embodiment.

The method for manufacturing the nickel-coated copper foil according to the present invention is a method for manufacturing the nickel-coated copper foil 1 having an overall thickness of 200 μm or less, and includes forming the nickel plating layer 3 made of Ni or Ni alloy on the surface of the copper foil made of Cu or a Cu alloy, which later becomes the copper layer 2, by a plating process. The copper foil made of Cu or a Cu alloy is prepared in consideration of increasing the overall thickness of the nickel-coated copper foil 1 by the thickness of the nickel plating layer 3 formed by the subsequent plating process. The thickness of the copper foil is smaller than the overall thickness of the nickel-coated copper foil 1 by the overall thickness of the nickel plating layer 3 (nickel plating layers 3a and 3b). The nickel plating layer (nickel plating layers 3a, 3b, 3c, and 3d) made of Ni or a Ni alloy is formed on the surface of the copper foil by the plating process. This plating process can be selected from various generally known plating processes such as electrolytic plating, strike plating, and electroless plating, depending on the thickness of the nickel plating layer 3 to be formed. For example, when electroless plating is adopted, a nickel plating layer containing a small amount (e.g. 5% or less) of P (phosphorus) can be formed. When the nickel plating layer 3 having a thickness of 0.05 μm or less is formed, strike plating in which a high current is applied and a short-time process is performed is suitable.

The aforementioned plating process is performed such that the thickness of the nickel plating layer 3 (the thickness of each of the nickel plating layers 3a and 3b) is 0.01 μm or more and 0.5 μm or less. Furthermore, the aforementioned plating process is performed such that the surface of the nickel plating layer 3 (the surface of each of the nickel plating layers 3a and 3b) has an a* value of 0 or more and 10 or less (preferably 9 or less and more preferably 7 or less)

and a b* value of 0 or more and 14 or less (preferably 12.5 or less and more preferably 12 or less) in the L*a*b* color system obtained by the SCI measurement method in accordance with JIS Z 8722. In the present invention, the thicknesses of the nickel plating layers 3c and 3d are not particularly limited.

In the present invention, a heat treatment can be performed after the aforementioned plating process. When the heat treatment is performed, it is performed such that the a* value of the surface of the nickel plating layer 3 (the surface of each of the nickel plating layers 3a and 3b) is 0 or more and 10 or less, and the b* value thereof is 0 or more and 14 or less. The holding temperature of the heat treatment is preferably set in the range from a temperature (e.g. more than 500° C.) exceeding the recrystallization temperature of the copper (copper layer 2) to a temperature (e.g. 1000° C.) at which the copper layer 2 does not melt, for example. The holding temperature is preferably more than 500° C. and 900° C. or lower, more preferably more than 500° C. and 800° C. or lower, and even more preferably more than 500° C. and 700° C. or lower. Furthermore, when the heat treatment is performed, it is preferable to perform the heat treatment in a non-oxidizing atmosphere. For example, an atmosphere in which a non-oxidizing gas such as nitrogen gas or argon gas is introduced to reduce the oxygen concentration and the dew point in a heat treatment furnace as much as possible is preferable.

From the above viewpoint, when the nickel-coated copper foil 1 is heat-treated, in order to easily put the surface of the nickel plating layer 3 of the nickel-coated copper foil 1 after the heat treatment in a surface state having an a* value of 0 or more and 10 or less (preferably 9 or less and more preferably 7 or less) and a b* value of 0 or more and 14 or less (preferably 12.5 or less and more preferably 12 or less), the aforementioned appropriate holding temperature is selected, and a non-oxidizing atmosphere is created such that excessive surface oxidation of the nickel plating layer 3 and excessive surface oxidation of the copper layer 2 that may be exposed on the surface are preferably significantly reduced or prevented.

A method for manufacturing the nickel-coated copper foil 10 shown in FIG. 2 as the modified example of the embodiment is now described, and differences from the method for manufacturing the nickel-coated copper foil 1 described above are mainly described.

The method for manufacturing the nickel-coated copper foil 10 is a method for manufacturing the nickel-coated copper foil 10 having an overall thickness of 200 µm or less, and includes forming the nickel plating layers 12 and 13 made of Ni or a Ni alloy on the surface of the copper foil made of Cu or a Cu alloy, which later becomes the copper layer 11, by a plating process. The copper foil made of Cu or a Cu alloy is prepared in consideration of increasing the overall thickness of the nickel-coated copper foil 10 by the thicknesses of the nickel plating layers 12 and 13 formed by the subsequent plating process. The thickness of the copper foil is smaller than the overall thickness of the nickel-coated copper foil 10 by the total thicknesses of the nickel plating layers 12 and 13. The nickel plating layers 12 and 13 made of Ni or a Ni alloy are formed on the surface of the copper foil by performing the plating process in the same manner as in the case of the nickel-coated copper foil 1 described above.

The nickel-coated copper foil plated through the aforementioned manufacturing method includes a nickel plating layer on the entire surface of the copper layer 11 like the nickel-coated copper foil 1 shown in FIG. 1. Therefore, the ends of the copper layer 11 on the X1 side and the X2 side are cut by performing a slit process on the nickel-coated copper foil after the plating process. Through these steps, the nickel-coated copper foil 10 having a predetermined width can be produced by including the nickel plating layer 12 on the surface of the copper layer 11 on the Z1 side, including the nickel plating layer 13 on the surface of the copper layer 11 on the Z2 side, and exposing the copper layer 11 on the end faces on the X1 side and the X2 side. After the plating process or the slit process, the same heat treatment as in the case of the nickel-coated copper foil 1 described above can be performed. In this case, the a* value and the b* value of the surfaces of the nickel plating layers 12 and 13 after the heat treatment are set within the predetermined ranges in consideration of the holding temperature and the atmosphere as in the case of the nickel-coated copper foil 1 described above.

EXAMPLES

A nickel-coated copper foil corresponding to the nickel-coated copper foil 1 shown in FIG. 1 was produced by the aforementioned method for manufacturing the nickel-coated copper foil 1, and various evaluations were performed. Specifically, as a metal material to be the copper layer 2, copper foils having a thickness of about 0.1 mm equivalent to C1020 (JIS standards) were prepared. The nickel plating layers 3 (nickel plating layers 3a, 3b, 3c, and 3d) having different thicknesses were formed on the surfaces of the copper foils by electrolytic plating or strike plating such that several types of nickel-coated copper foils 1 were produced. Furthermore, some of the nickel-coated copper foils 1 were heat-treated under predetermined conditions.

The nickel-coated copper foils 1 including the nickel plating layers 3 having a thickness of 0.10 µm or more were formed by Ni electrolytic plating. Specifically, the copper foils on which the nickel plating layers 3 were to be formed were subjected to alkaline electrolytic degreasing (liquid temperature of 60° C., current density of 4 A/dm$^2$, energization time of 20 seconds), then pickled (dipping time of 15 seconds in a room temperature atmosphere of 20° C. to 40° C.), and then subjected to Ni electrolytic plating. The Ni electrolytic plating was performed using a common watt bath composition of pH 3.8 to 4.2 containing 240 g/L to 300 g/L of nickel sulfate, 40 g/L to 70 g/L of nickel chloride, and 30 g/L to 45 g/L of boric acid. In the Ni electrolytic plating, the bath temperature was set to 50° C., the current density was set to 4 A/dm$^2$, and the energization time was changed in the range from 6 seconds to 60 seconds such that the thicknesses of the nickel plating layers 3 were varied. The thickness of the nickel plating layer 3 was 0.09 µm when the energization time was 6 seconds, was 0.19 µm when the energization time was 12 seconds, was 0.38 µm when the energization time was 36 seconds, and was 0.82 µm when the energization time was 60 seconds, for example.

The nickel-coated copper foils 1 including the nickel plating layers 3 having a thickness of less than 0.10 µm were formed by Ni strike plating. Specifically, similarly to the Ni electrolytic plating, the copper foils on which the nickel plating layers 3 were to be formed were subjected to alkaline electrolytic degreasing (liquid temperature of 60° C., current density of 4 A/dm$^2$, energization time of 20 seconds), then pickled (dipping time of 15 seconds in a room temperature atmosphere of 20° C. to 40° C.), and then subjected to Ni strike plating. The Ni strike plating was performed using a common wood bath composition of pH 1.5 or less containing about 240 g/L of nickel chloride and about 125 mL/L of hydrochloric acid. In the Ni strike plating, the bath temperature was set to a room temperature (20° C. to 40° C.), the energization time was set to 20 seconds, and the current density was changed in the range from 2 A/dm² to 4 A/dm² such that the thicknesses of the nickel plating layers 3 were varied. The thickness of the nickel plating layer 3 was 0.01 µm when the current density was 2 A/dm², and was 0.03 µm when the current density was 4 A/dm², for example.

Various evaluations performed using the produced several types of nickel-coated copper foils 1 and the results thereof are now described with reference to tables and the drawings.
(Thickness of Nickel Plating Layer)

The thicknesses of the nickel plating layers 3 of the nickel-coated copper foils 1 were obtained using a fluorescent X-ray analyzer. Specifically, in central portions (a position of 35 mm in the longitudinal direction and 1.5 mm in the width direction from an arbitrary corner) of test pieces (total length of 70 mm, width of 3 mm) cut out from the nickel-coated copper foils 1, using a fluorescent X-ray film thickness meter (SFT9500 manufactured by Seiko Instruments Inc.), the Ni intensity distributions on the surfaces of the nickel plating layers (the Ni intensity distributions on the surfaces of the nickel plating layers 3a shown in FIG. 1) were obtained, and the thicknesses of the nickel plating layers (the thicknesses of the nickel plating layers 3a shown in FIG. 1) were obtained based on these Ni intensity distributions. The thicknesses were similarly obtained for comparative examples and a reference example. The results are shown in TABLE 1.

TABLE 1

| NO. | THICKNESS OF NICKEL PLATING LAYER (µm) | REMARKS |
|---|---|---|
| 1 | 0 | COMPARATIVE EXAMPLE |
| 2 | 0.01 | EXAMPLE |
| 3 | 0.03 | |
| 4 | 0.09 | |
| 5 | 0.10 | |
| 6 | 0.19 | |
| 7 | 0.30 | |
| 8 | 0.38 | |
| 9 | 0.50 | |
| 10 | 0.60 | COMPARATIVE EXAMPLE |
| 11 | 0.82 | |
| 12 | 1.0 | |
| 13 | 3.0 | |
| 14 | 25 | REFERENCE EXAMPLE |

Each of test pieces Nos. 2 to 9 shown as Examples in TABLE 1 is a nickel-coated copper foil according to the embodiment of the present invention formed with an overall thickness of about 0.1 mm by rolling. The thicknesses of the nickel plating layers of the test pieces Nos. 2 to 9 shown as Examples are in the range of 0.01 µm or more and 0.50 µm or less. Each of test pieces Nos. 10 to 13 shown as comparative examples in TABLE 1 is a nickel-coated copper foil formed with an overall thickness of about 0.1 mm by rolling. The thicknesses of the nickel plating layers of the test pieces Nos. 10 to 13 shown as comparative examples exceed 0.50 µm. In the test pieces Nos. 12 and 13 including the nickel plating layers having a thickness of 1.0 µm or more, the overlaying nickel plating layers are densely formed, and thus the underlying copper layers are not exposed on the surfaces. A test piece No. 1 shown as a comparative example in TABLE 1 is a copper foil (rolled foil) made of C1020 and formed with an overall thickness of about 0.1 mm by rolling, and is not covered with a nickel plating layer. A test piece No. 14 shown as a reference example in TABLE 1 is a clad foil (rolled foil) having a three-layer structure of nickel layer/copper layer/nickel layer (a thickness ratio of the layers is 1:2:1) and formed with an overall thickness of about 0.1 mm by rolling, and has not been plated. The overall thicknesses (see TABLE 3) of the test pieces Nos. 1 to 14 shown in TABLE 1 were measured using a commercially available micrometer. The test pieces No. 1 and No. 14 have not been heat-treated after the final rolling. The test pieces Nos. 2 to 13 have not been heat-treated after the nickel plating layers 3 were formed.
(L* Value, a* Value, b* Value)

The L* values, the a* values, and the b* values of the surfaces of the nickel plating layers 3 of the nickel-coated copper foils 1 in the L*a*b* color system obtained by the SCI measurement method in accordance with JIS Z 8722 were obtained using a colorimeter. Specifically, three test pieces (total length of 10 mm, width of 3 mm) were arranged side by side, and the edges of the test pieces in the width direction were adjacent to each other to form rectangular surfaces (long side of 10 mm, short side of 9 mm) to be measured. Then, in a room temperature environment, using a spectrophotometric colorimeter (CM-2600 d manufactured by KONICA MINOLTA, INC., measurement diameter φ of 8 mm), the L* values, the a* values, and the b* values of the surfaces of the nickel plating layers 3 (nickel plating layers 3a shown in FIG. 1) at the central portions of the surfaces to be measured were obtained. The L* values, the a* values, and the b* values were similarly obtained for comparative examples and reference examples. The results are shown in TABLE 2. Test pieces Nos. 2 to 12 shown in TABLE 2 correspond to the test pieces Nos. 2 to 12 shown in TABLE 1.

TABLE 2

| NO. | THICKNESS OF NICKEL PLATING LAYER (µm) | SCI METHOD | | | REMARKS |
|---|---|---|---|---|---|
| | | L* | a* | b* | |
| 2 | 0.01 | 71.75 | 9.07 | 12.98 | EXAMPLE |
| 3 | 0.03 | 70.45 | 2.50 | 10.28 | |
| 4 | 0.09 | 75.42 | 1.75 | 11.57 | |
| 6 | 0.19 | 77.99 | 1.35 | 8.62 | |
| 8 | 0.38 | 77.38 | 1.68 | 10.27 | |
| 10 | 0.60 | 79.47 | 1.27 | 8.39 | COMPARATIVE EXAMPLE |
| 11 | 0.82 | 72.69 | 2.29 | 11.44 | |
| 12 | 1.0 | 74.11 | 1.50 | 8.12 | |
| COPPER FOIL (WITHOUT HEAT TREATMENT AFTER POLISHING) | | 82.98 | 14.17 | 15.99 | REFERENCE EXAMPLE |
| COPPER FOIL (WITH HEAT TREATMENT AFTER POLISHING) | | 76.02 | 17.47 | 25.06 | |

The a* values of the surfaces of the nickel plating layers of the test pieces Nos. 2 to 8 shown as Examples in TABLE 2 were in the range of 0 or more and 10 or less, and the b* values thereof were in the range of 0 or more and 14 or less. The a* values of the test pieces Nos. 3 to 8 were 1 or more, and preferably 7 or less, and the b* values thereof were 8 or more, and preferably 12 or less. The L* values of the surfaces of the nickel plating layers of the test pieces Nos. 10 to 12 shown as comparative examples in TABLE 2 were approximately 72 to 80, the a* values thereof were approximately 1 to 2.5, and the b* values thereof were approximately 8 to 11.5. Copper foils shown as reference examples in TABLE 2 are a copper foil that has not been heat-treated after polishing (the arithmetic average roughness Ra is about 0.02 µm) and a copper foil that has been heat-treated in a non-oxidizing atmosphere after similar polishing. The L* values thereof were approximately 76 to 83, the a* values thereof were more than 10 and approximately 14 to 15.5, and the b* values thereof were more than 14 and approximately 16 to 25. In the case of the copper foils shown as reference examples, a heat treatment was performed such that the L* value became smaller and both the a* value and the b* value became larger. The surface state of the conventional copper foil subjected to laser welding is considered to be close to the surface state of the aforementioned copper foil after the heat treatment, considering the property of copper that is easily oxidized in a general atmosphere.

Figure 3:
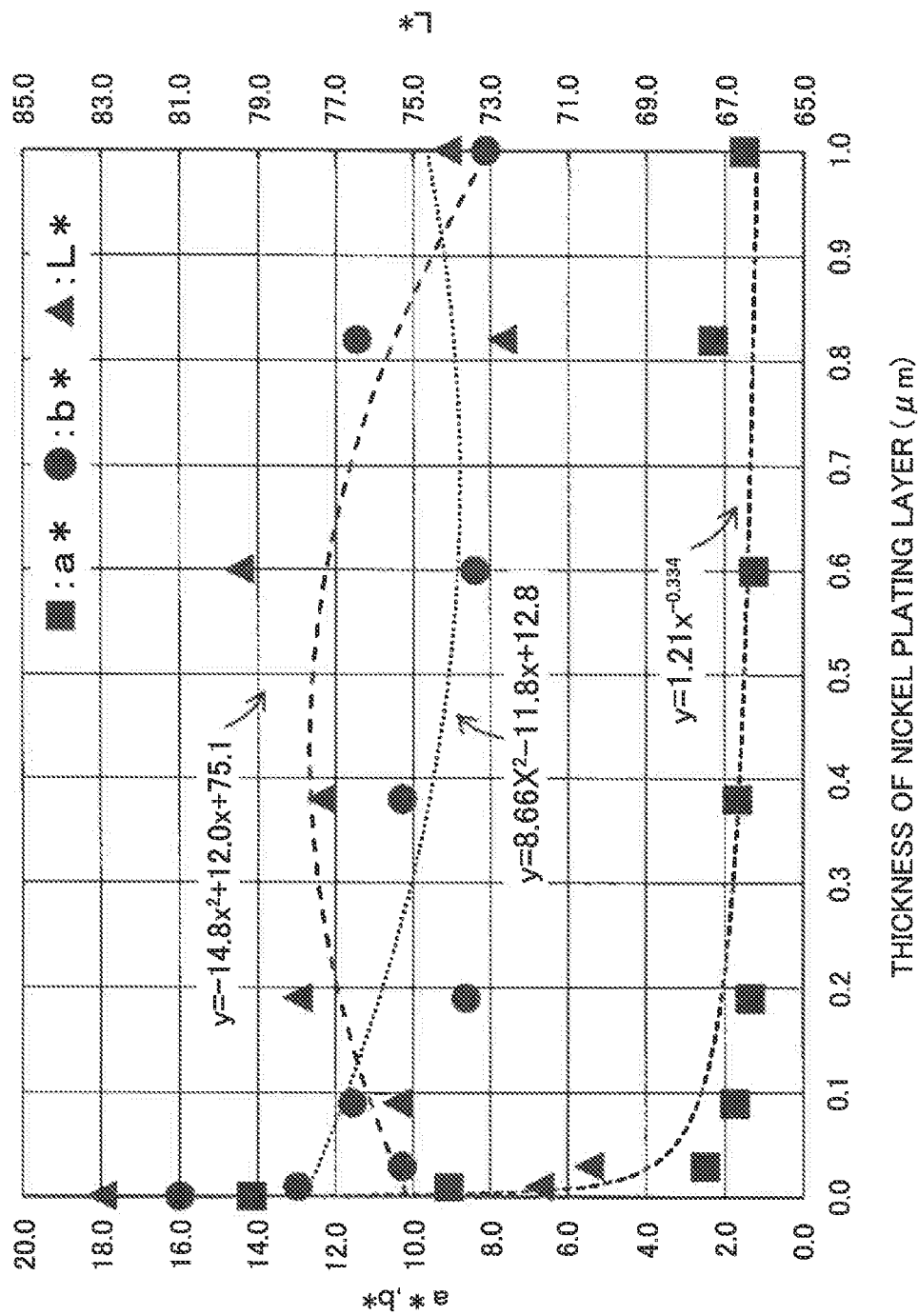
FIG. 3 A diagram (graph) showing the relationship between the thickness of a nickel plating layer, and an L* value, an a* value, and a b* value about the example of the embodiment of the nickel-coated copper foil according to the present invention.

FIG. 3 is a graph showing the relationship between the thickness of the nickel plating layer of the test piece (nickel-coated copper foil), and the L* value, the a* value, and the b* value based on the data shown in TABLE 2. Three types of curves shown in FIG. 3 are approximate curves (see mathematical formulae shown in FIG. 3) for showing a rough tendency of changes in the L* value, the a* value, and the b* value with a change in the thickness of the nickel plating layer. The L* value is maximized when the thickness of the nickel plating layer is around 0.4 µm to 0.5 µm, and it can be seen that when the thickness becomes less than 0.5 µm or exceeds 0.5 µm, the L* value tends to become smaller with 0.5 µm as the vertex. It can be seen that the a* value tends to increase sharply when the thickness of the nickel plating layer is less than 0.03 µm. Furthermore, it can be seen that the a* value tends to slightly change when the thickness of the nickel plating layer is 0.03 µm or more, and becomes substantially constant from around 0.5 µm or more. It can be seen that a change in the b* value is less stable than a change in the a* value, but the b* value tends to decrease as the thickness of the nickel plating layer increases. Furthermore, it can be seen that the b* value is minimized when the thickness of the nickel plating layer is around 0.5 µm or 0.6 µm, and then tends to become substantially constant.

As described above, the a* value and the b* value tend to be substantially constant when the thickness of the nickel plating layer exceeds around 0.5 µm. This is conceivably because the plating structure becomes denser due to an increase in the thickness of the nickel plating layer such that the surface state becomes close to that of a nickel foil (e.g. a rolled foil). From this point of view, it has been found that there is a characteristic relationship between the thickness of the nickel plating layer and the L* value, the a* value, and the b* value when the thickness of the nickel plating layer is 0.5 µm or less. When the thickness of the nickel plating layer is 0.5 µm or less, the relationship between the a* value and the b* value is interesting, and thus it has been found that a change in the a* value tends to be remarkable and characteristic especially when the thickness of the nickel plating layer is 0.5 µm or less.

The polished copper foil described above had a surface state without cloudiness in which the background was reflected. On the other hand, the aforementioned copper foil subjected to the heat treatment after polishing had a cloudy surface state in which the background was not reflected. Considering a change in the surface state of the copper foil before and after the heat treatment, and considering that Cu (copper foil) is inferior in oxidation resistance to Ni (nickel foil), easily oxidized, and easily clouded, the nickel plating layer 3 of the nickel-coated copper foil 1 is less susceptible to heat treatment than the copper foil, and thus the surface state of the nickel plating layer 3 is conceivably unlikely to change. From this point of view, when the same heat treatment is performed on each of the test pieces Nos. 2 to 8, the surface is mostly covered with the nickel plating layer having a gray surface color instead of the copper layer 2 having a red and yellow surface color, and thus conceivably, the L* value does not exceed 79, the a* and b* values do not exceed 10, and the b* value does not exceed 14.

(Volume Resistivity)

The volume resistivity of the nickel-coated copper foil 1 was obtained by the 4-terminal method in accordance with JIS C 2525. Specifically, a circuit to which the 4-terminal method in accordance with JIS C 2525 was applied was configured in a room temperature environment, and a test piece (width of 3±0.01 mm or width of 10±0.01 mm, total length of 70±0.1 mm) cut out from the nickel-coated copper foil 1 was arranged in this circuit. A distance between the contacts of voltage terminals at this time was 50.167 mm. Using this circuit, a current of 500 mA or 1000 mA was applied to the test piece, and the voltage was measured. The current was set to 1000 mA only for the test piece having a width of 10 mm. The volume resistivity of the nickel-coated copper foil 1 was obtained from this voltage (average value), the volume (thickness and width) of the test piece, the distance between the terminals, and the applied current. The results are shown in TABLE 3. Test pieces Nos. 1 to 14 (Nos. 1A to 14A and Nos. 1B to 14B) shown in TABLE 3 correspond to the test pieces Nos. 1 to 14 shown in TABLE 1.

TABLE 3

| | TEST PIECE | | | | | | |
|---|---|---|---|---|---|---|---|
| NO. | OVERALL THICKNESS (mm) | WIDTH (mm) | THICKNESS OF NICKEL PLATING LAYER (µm) | HEAT TREATMENT | VOLTAGE (mV) | VOLUME RESISTIVITY (µ Ω · cm) | REMARKS |
| 1 | 0.1132 | 3.219 | 0 | NO HEAT TREATMENT | 1.2185 | 1.77 | COMPARATIVE EXAMPLE |
| 3 | 0.1116 | 3.231 | 0.03 | TREATMENT | 1.2925 | 1.86 | EXAMPLE |
| 4 | 0.1097 | 3.177 | 0.09 | | 1.3379 | 1.86 | |
| 5 | 0.1131 | 3.195 | 0.10 | | 1.3005 | 1.87 | |
| 6 | 0.1131 | 3.195 | 0.19 | | 1.3005 | 1.87 | |
| 7 | 0.1106 | 3.183 | 0.30 | | 1.3252 | 1.86 | |
| 8 | 0.1106 | 3.183 | 0.38 | | 1.3252 | 1.86 | |
| 9 | 0.1137 | 3.221 | 0.50 | | 1.2919 | 1.89 | |
| 10 | 0.1012 | 10.020 | 0.60 | | 0.8890 | 1.80 | COMPARATIVE EXAMPLE |
| 11 | 0.1137 | 3.221 | 0.82 | | 1.2919 | 1.89 | |

TABLE 3-continued

| | TEST PIECE | | | | | | |
|---|---|---|---|---|---|---|---|
| NO. | OVERALL THICKNESS (mm) | WIDTH (mm) | THICKNESS OF NICKEL PLATING LAYER (μm) | HEAT TREATMENT | VOLTAGE (mV) | VOLUME RESISTIVITY (μΩ·cm) | REMARKS |
| 12 | 0.1030 | 10.020 | 1.0 | | 0.8890 | 1.83 | |
| 14 | 0.1055 | 2.981 | 25 | | 2.3487 | 2.94 | REFERENCE EXAMPLE |
| 1A | 0.1112 | 3.238 | 0 | HOLDING | 1.2302 | 1.77 | COMPARATIVE EXAMPLE |
| 3A | 0.1139 | 3.203 | 0.03 | TEMPERATURE | 1.2581 | 1.83 | EXAMPLE |
| 4A | 0.1147 | 3.202 | 0.09 | 600° C. | 1.2768 | 1.87 | |
| 5A | 0.1107 | 3.212 | 0.10 | HOLDING | 1.2678 | 1.80 | |
| 6A | 0.1107 | 3.212 | 0.19 | TIME | 1.2678 | 1.80 | |
| 7A | 0.1100 | 3.241 | 0.30 | 7 SECONDS | 1.2721 | 1.81 | |
| 8A | 0.1100 | 3.241 | 0.38 | | 1.2721 | 1.81 | |
| 9A | 0.1112 | 3.237 | 0.50 | | 1.2717 | 1.82 | |
| 10A | 0.1006 | 10.030 | 0.60 | | 0.8820 | 1.77 | COMPARATIVE EXAMPLE |
| 11A | 0.1112 | 3.237 | 0.82 | | 1.2717 | 1.82 | |
| 12A | 0.1015 | 10.030 | 1.0 | | 0.8820 | 1.79 | |
| 14A | 0.1047 | 2.984 | 25 | | 2.3562 | 2.93 | REFERENCE EXAMPLE |
| 1B | 0.1132 | 3.238 | 0 | HOLDING | 1.2196 | 1.78 | COMPARATIVE EXAMPLE |
| 3B | 0.1128 | 3.216 | 0.03 | TEMPERATURE | 1.2596 | 1.82 | EXAMPLE |
| 4B | 0.1106 | 3.184 | 0.09 | 750° C. | 1.2791 | 1.80 | |
| 5B | 0.1123 | 3.201 | 0.10 | HOLDING | 1.2629 | 1.81 | |
| 6B | 0.1123 | 3.201 | 0.19 | TIME | 1.2629 | 1.81 | |
| 7B | 0.1136 | 3.163 | 0.30 | 7 SECONDS | 1.3102 | 1.88 | |
| 8B | 0.1136 | 3.163 | 0.38 | | 1.3102 | 1.88 | |
| 9B | 0.1118 | 3.184 | 0.38 | | 1.2856 | 1.82 | |
| 11B | 0.1118 | 3.185 | 0.82 | | 1.2856 | 1.82 | COMPARATIVE EXAMPLE |
| 14B | 0.1043 | 2.986 | 25 | | 2.3821 | 2.96 | REFERENCE EXAMPLE |

The volume resistivity of each of the test pieces Nos. 3 to 9, 3A to 9A, and 3B to 9B (nickel-coated copper foils) shown as Examples in TABLE 3 was 1.9 μΩ·cm or less, and was in the range of 2 μΩ·cm or less. Thus, it has been found that the test pieces each having the nickel plating layer shown as Examples are all sufficiently smaller in volume resistivity than the conventional clad foils Nos. 14, 14A, and 14B (the thickness of the nickel layer is 25 μm) shown as reference examples in TABLE 3, and differences from the volume resistivities (1.77 μΩ·cm to 1.78 μΩ·cm) of the conventional copper foils Nos. 1, 1A, and 1B (including no nickel plating layer) shown as comparative examples in TABLE 3 are small. The test pieces Nos. 1 to 14 shown in TABLE 3 were not heat-treated. The test pieces Nos. 3A to 13A and 3B to 13B were each heat-treated in a non-oxidizing atmosphere under the holding conditions shown in TABLE 3 after the nickel plating layer 3 was formed. The test pieces Nos. 1A, 14A, 1B, and 14B were heat-treated in a non-oxidizing atmosphere under the holding conditions shown in TABLE 3 after the final rolling.

(Laser Welding)

A laser welding test was performed using the nickel-coated copper foils of Examples and comparative examples. Specifically, test pieces (total length of 70 mm, width of 3 mm) cut out from the nickel-coated copper foils and a copper foil (thickness of about 10 μm) made of C1020 were overlapped in the thickness direction, and YAG laser light was radiated to three different points of the test pieces along the total length direction using a YAG laser welder (ML-2150A manufactured by AMADA MIYACHI CO., LTD., wavelength of 1064 nm, spot diameter φ of 0.6 mm at the focal position). The YAG laser light was radiated at an irradiation angle of 15 degrees, i.e. from a position tilted 15 degrees from a perpendicular with respect to each of the surfaces of the nickel plating layers of the test pieces. The laser welding test was performed while changing the irradiation time of the YAG laser light and the peak output of the pulse. The results are shown in TABLE 4. Test pieces Nos. 2 to 13 (Nos. 2A to 13A, No. 4B, and No. 4C) shown in TABLE 4 correspond to the test pieces Nos. 1 to 14 shown in TABLE 1.

TABLE 4

| TEST PIECE | | | LASER LIGHT IRRADIATION TIME (ms) | | | | | | | |
|---|---|---|---|---|---|---|---|---|---|---|
| | | | 1.0 | | | | | | | |
| | THICKNESS OF NICKEL PLATING LAYER | HEAT TREATMENT HOLDING | LASER LIGHT OUTPUT (kW) | | | | | | | |
| NO. | (μm) | CONDITIONS | 2.5 | 2.8 | 3.0 | 3.2 | 3.4 | 3.6 | 3.8 | 4.0 | 4.2 |
| 2 | 0.01 | NO HEAT TREATMENT | — | — | — | — | — | — | — | — | — |
| 2A | 0.01 | 600° C., 7 SECONDS | × | × | × | × | × | × | ▲ | ● | ● |
| 3 | 0.03 | NO HEAT TREATMENT | — | — | — | — | — | ● | — | — | — |

TABLE 4-continued

| | | | | | | | | | | |
|---|---|---|---|---|---|---|---|---|---|---|
| 3A | 0.03 | 600° C., 7 SECONDS | — | — | — | — | — | ● | ● | — | — |
| 4 | 0.09 | NO HEAT TREATMENT | ● | — | — | ● | — | — | — | — | — |
| 4A | 0.09 | 600° C., 7 SECONDS | — | — | — | ● | — | — | ● | — | — |
| 4B | 0.09 | 750° C., 7 SECONDS | — | — | — | ● | — | — | ● | — | — |
| 4C | 0.09 | 900° C., 7 SECONDS | — | — | — | ● | — | — | — | — | — |
| 5 | 0.10 | NO HEAT TREATMENT | ● | ● | ● | ● | — | — | — | — | ● |
| 5A | 0.10 | 600° C., 7 SECONDS | ● | ● | ● | ● | — | — | — | — | ● |
| 7 | 0.30 | NO HEAT TREATMENT | — | ● | ● | ● | — | — | — | — | ● |
| 7A | 0.30 | 600° C., 7 SECONDS | — | ● | ● | ● | — | — | — | — | ● |
| 9 | 0.50 | NO HEAT TREATMENT | — | ● | ● | ● | — | — | — | — | ● |
| 9A | 0.50 | 600° C., 7 SECONDS | — | ● | ● | ● | — | — | — | — | ● |
| 10 | 0.60 | NO HEAT TREATMENT | — | — | — | ● | HOLE | HOLE | — | — | — |
| 10A | 0.60 | 600° C., 7 SECONDS | — | — | — | ● | HOLE | HOLE | — | — | — |
| 12 | 1.0 | NO HEAT TREATMENT | — | — | — | ● | ● | HOLE | — | — | — |
| 12A | 1.0 | 600° C., 7 SECONDS | — | — | — | ● | ● | HOLE | — | — | — |
| 13 | 3.0 | NO HEAT TREATMENT | — | ● | HOLE | HOLE | HOLE | HOLE | HOLE | HOLE | HOLE |
| 13A | 3.0 | 600° C., 7 SECONDS | — | ● | HOLE | HOLE | HOLE | HOLE | HOLE | HOLE | HOLE |

| TEST PIECE | | | LASER LIGHT IRRADIATION TIME (ms) | | | | | | | |
|---|---|---|---|---|---|---|---|---|---|---|
| | THICKNESS OF NICKEL PLATING LAYER (μm) | HEAT TREATMENT HOLDING CONDITIONS | 1.0 | | 2.0 | | | | 2.5 | 3.0 |
| | | | LASER LIGHT OUTPUT (kW) | | | | | | | |
| | | | 4.5 | 4.8 | 2.5 | 2.7 | 2.8 | 2.7 | 2.8 | 2.7 |
| 2 | 0.01 | NO HEAT TREATMENT | — | — | — | — | × | × | ● | — |
| 2A | 0.01 | 600° C., 7 SECONDS | ● | ● | × | ▲ | ● | ● | — | HOLE |
| 3 | 0.03 | NO HEAT TREATMENT | — | — | — | — | ● | HOLE | — | — |
| 3A | 0.03 | 600° C., 7 SECONDS | — | — | — | — | — | ● | — | — |
| 4 | 0.09 | NO HEAT TREATMENT | — | — | ● | — | — | ● | — | — |
| 4A | 0.09 | 600° C., 7 SECONDS | — | — | ● | — | — | ● | — | — |
| 4B | 0.09 | 750° C., 7 SECONDS | — | — | ● | — | — | ● | — | — |
| 4C | 0.09 | 900° C., 7 SECONDS | — | — | ● | — | — | ● | — | — |
| 5 | 0.10 | NO HEAT TREATMENT | ● | ● | ● | — | — | ● | — | — |
| 5A | 0.10 | 600° C., 7 SECONDS | ● | ● | ● | — | — | ● | — | — |
| 7 | 0.30 | NO HEAT TREATMENT | ● | HOLE | — | — | — | — | — | — |
| 7A | 0.30 | 600° C., 7 SECONDS | ● | HOLE | — | — | — | — | — | — |
| 9 | 0.50 | NO HEAT TREATMENT | HOLE | HOLE | — | — | — | — | — | — |
| 9A | 0.50 | 600° C., 7 SECONDS | HOLE | HOLE | — | — | — | — | — | — |
| 10 | 0.60 | NO HEAT TREATMENT | — | — | — | — | — | — | — | — |
| 10A | 0.60 | 600° C., 7 SECONDS | — | — | — | — | — | — | — | — |
| 12 | 1.0 | NO HEAT TREATMENT | | | | | | | | |

TABLE 4-continued

| | | | | | | | | | | |
|---|---|---|---|---|---|---|---|---|---|---|
| 12A | 1.0 | 600° C., 7 SECONDS | — | — | — | — | — | — | — | — |
| 13 | 3.0 | NO HEAT TREATMENT | HOLE | HOLE | — | — | — | — | — | — |
| 13A | 3.0 | 600° C., 7 SECONDS | HOLE | HOLE | — | — | — | — | — | — |

[WELDING EVALUATION] ●: WELDABLE,
▲: WELDABLE (PARTIALLY UNWELDABLE),
×: UNWELDABLE (NOT MELTED),
HOLE: UNWELDABLE (THROUGH-HOLE GENERATED),
—: NOT EVALUATED

The test pieces Nos. 2 to 9, Nos. 2A to 9A, No. 4B, and No. 4C shown in TABLE 4 are Examples. Among these, the test pieces Nos. 3 to 9, Nos. 3A to 9A, No. 4B, and No. 4C are Examples that are considered preferable from the viewpoint of welding stability. The test pieces Nos. 2 to 5, Nos. 2A to 5A, No. 4B, and No. 4C are Examples in which the thicknesses of the nickel plating layers are suitably formed, and are considered preferable from the viewpoint of production efficiency. The test pieces Nos. 3 to 5, Nos. 3A to 5A, No. 4B, and No. 4C are Examples in which the welding stabilities are good and the thicknesses of the nickel plating layers are suitable, and are considered more preferable. The test pieces Nos. 10 to 13 and Nos. 10A to 13A shown in TABLE 4 are comparative examples in which the nickel plating layers are formed with a thickness of 0.6 μm or more. The test pieces Nos. 2A to 13A correspond to the test pieces Nos. 2 to 14 shown in TABLE 1, and were heat-treated in a non-oxidizing atmosphere under the holding conditions shown in TABLE 4 after the nickel plating layers were formed. The test pieces Nos. 4B and 4C correspond to the test piece No. 4 shown in TABLE 1, and were heat-treated in a non-oxidizing atmosphere under the holding conditions shown in TABLE 4 after the nickel plating layers were formed.

As an evaluation of laser welding, the test pieces after laser welding and the copper foils were forcibly peeled off, and the bonded states of the test pieces at three different points (welded portions) along the entire length direction were confirmed. Consequently, in the cases described as "●: weldable" in TABLE 4, the test pieces were peeled off around the welded portions, and the welded portions were maintained in a bonded state. From this, it has been found that the welded portions have sufficient bonding strength. In the cases described as "▲: weldable (partially unweldable)" in TABLE 4, the test pieces were peeled off at one or more of the three welded portions, and the remaining welded portions were maintained in a bonded state. From this, it has been found that welding is possible, but a welded portion having insufficient bonding strength may be formed. In the cases described as "×: unweldable (not melted)" in TABLE 4, the test pieces were not melted even when irradiated with YAG laser light under predetermined conditions, and they could not be bonded to the copper foils. In the cases described as "hole: unweldable (through-hole generated)" in TABLE 4, when YAG laser light is radiated under predetermined conditions, both the test pieces and the opposite materials (copper foils) were rapidly melted such that through-holes were generated, and the bonded states could not be obtained. The laser welding test was not performed under the conditions described as "-: not evaluated" in TABLE 4.

For reference, an attempt was made to bond a copper foil (having no nickel plating layer), a nickel foil, and a clad foil having a three-layer structure (nickel layer/copper layer/ nickel layer) (the thickness of one nickel layer is 25 μm), which were formed with an overall thickness of about 0.1 mm by rolling, to a copper foil made of C1020 (thickness of about 10 μm) by the same method as the laser welding test described above. Consequently, the copper foil had a problem due to the power density of the YAG laser light described above, and could not be laser welded. On the other hand, the nickel foil and the clad foil could be laser welded.

From the results of the laser welding test described above, it has been confirmed that even when the nickel plating layer of the nickel-coated copper foil has a thickness of 0.01 μm, the laser light irradiation conditions (irradiation time and pulse peak output) are appropriately adjusted such that welding is possible. Furthermore, it has been confirmed that the nickel plating layer of the nickel-coated copper foil is formed with a thickness of 0.03 μm or more such that the adjustment ranges of the laser light irradiation conditions (irradiation time and pulse peak output) are widened. Thus, it has been found that a nickel plating layer having a thickness of 0.03 μm or more is preferable from the viewpoint of improving welding stability. Furthermore, it has been found that in comparison with the test pieces Nos. 5 and 5A in which the thickness of the nickel plating layer of the nickel-coated copper foil is 0.1 μm, in the test pieces Nos. 7 to 13 and Nos. 7A to 13A in which the thickness of the nickel plating layer exceeds 0.1 μm, the adjustment ranges of the laser light irradiation conditions (irradiation time and pulse peak output) are narrowed. It has been confirmed that especially in the test pieces Nos. 10 to 13 and Nos. 10A to 13A in which the thickness of the nickel plating layer exceeds 0.5 μm, the adjustment ranges of the laser light irradiation conditions (irradiation time and pulse peak output) are narrowed. Thus, it has been found that a nickel plating layer having a thickness of 0.5 μm or less is preferable from the viewpoint of simplifying adjustment of the laser light irradiation conditions and improving the production efficiency by forming a nickel plating layer with an appropriate thickness.

From the above, it has been confirmed that the nickel-coated copper foil having an overall thickness of 200 μm or less and including the copper layer made of Cu or a Cu alloy, and the nickel plating layer made of Ni or a Ni alloy, covering the surface of the copper layer, having a thickness of 0.01 μm or more and 0.5 μm or less, and including a surface having an a* value of 0 or more and 10 or less and a b* value of 0 or more and 14 or less in the L*a*b* color system obtained by the SCI measurement method in accordance with JIS Z 8722 can be subjected to application of YAG laser welding, has a low volume resistivity (2 μΩ·cm or less), and is suitable for mass production.

INDUSTRIAL APPLICABILITY

The present invention has industrial availability in that the nickel plating layer with a thickness of 0.5 μm or less suitable for mass production is formed on the surface of the copper foil by Ni plating such that the nickel-coated copper foil to which YAG laser welding can be applied while reducing the electrical resistivity (volume resistivity) is obtained, and it is possible to provide the nickel-coated copper foil suitable as the conductive material used for the leads and the negative electrode collectors of various batteries such as a lithium-ion secondary battery, and the method for manufacturing the same.

DESCRIPTION OF REFERENCE NUMERALS

1: nickel-coated copper foil
2: copper layer
3: nickel plating layer
3a-3d: nickel plating layer
10: nickel-coated copper foil
11: copper layer
12: nickel plating layer
13: nickel plating layer

The invention claimed is:

1. A nickel-coated copper foil comprising:
a copper layer made of Cu or a Cu alloy; and
an upper exposed nickel plating layer made of Ni or a Ni alloy, the upper exposed nickel plating layer covering an upper surface of the copper layer and exposing a surface opposite to a surface in contact with the copper layer in order to be welded to a portion of an other material used in batteries by YAG laser,
a bottom exposed nickel plating layer made of Ni or a Ni alloy, the bottom exposed nickel plating layer covering a bottom surface of the copper layer and exposing a surface opposite to a surface in contact with the copper layer in order to be welded to a portion of an other material used in batteries by YAG laser,
the upper exposed nickel plating layer and the bottom exposed nickel plating layer having a thickness of 0.01 µm or more and less than 0.1 µm,
surfaces of the upper exposed nickel plating layer and the bottom exposed nickel plating layer have an L* value of 70 or more and 78 or less, an a* value of 0 or more and 4 or less and a b* value of 0 or more and 14 or less in an L*a*b* color system obtained by an SCI measurement method in accordance with JIS Z 8722,
at least one of the surfaces of the upper exposed nickel plating layer and the bottom exposed nickel plating layer are welded to a portion of an other material used in batteries by YAG laser,
and wherein the nickel-coated copper foil has an overall thickness of 100 µm or more and 200 µm or less.

2. The nickel-coated copper foil according to claim 1, wherein the upper exposed nickel plating layer and the bottom exposed nickel plating layer have the thickness of 0.03 µm or more and less than 0.1 µm.

3. The nickel-coated copper foil according to claim 2, having a volume resistivity of 2 µΩ-cm or less, the volume resistivity being obtained in a room temperature environment by a 4-terminal method in accordance with JIS C 2525.

4. The nickel-coated copper foil according to claim 1, having a volume resistivity of 2 µΩ-cm or less, the volume resistivity being obtained in a room temperature environment by a 4-terminal method in accordance with JIS C 2525.

5. A method for manufacturing the nickel-coated copper foil according to claim 1, the method comprising:
forming a nickel plating layer made of Ni or a Ni alloy on a surface of the copper foil made of Cu or the Cu alloy by a plating process; wherein
the plating process is performed such that the nickel plating layer has a thickness of 0.01 µm or more and less than 0.1 µm and includes a surface having an a* value of 0 or more and 4 or less and a b* value of 0 or more and 14 or less in an L*a*b* color system obtained by an SCI measurement method in accordance with JIS Z 8722.

6. The method for manufacturing a nickel-coated copper foil according to claim 5, wherein after the plating process, a heat treatment is performed such that the nickel plating layer includes the surface having the a* value of 0 or more and 4 or less and the b* value of 0 or more and 14 or less in the L*a*b* color system obtained by the SCI measurement method in accordance with JIS Z 8722.

7. A battery containing the nickel-coated copper foil according to claim 1.

8. A lithium-ion secondary battery containing the nickel-coated copper foil according to claim 1.

* * * * *